(12) United States Patent
Bitter et al.

(10) Patent No.: US 7,324,104 B1
(45) Date of Patent: Jan. 29, 2008

(54) METHOD OF CENTERLINE GENERATION IN VIRTUAL OBJECTS

(75) Inventors: Ingmar Bitter, Rockville, MD (US); Arie E. Kaufman, Plainview, NY (US); Ming Wan, Stony Brook, NY (US); Jerome Liang, Stony Brook, NY (US); Mark R. Wax, Greenlawn, NY (US)

(73) Assignee: The Research Foundation of State University of New York, Stony Brook, NY (US)

( * ) Notice: Subject to any disclaimer, the term of this patent is extended or adjusted under 35 U.S.C. 154(b) by 679 days.

(21) Appl. No.: 10/246,015

(22) Filed: Sep. 16, 2002

Related U.S. Application Data

(60) Provisional application No. 60/322,046, filed on Sep. 14, 2001.

(51) Int. Cl.
*G06T 15/00* (2006.01)
*G06T 17/00* (2006.01)
*G06T 15/50* (2006.01)

(52) U.S. Cl. .................. 345/420; 345/426; 345/419

(58) Field of Classification Search ............. 382/154, 382/128, 259; 345/619–641, 418–428
See application file for complete search history.

(56) References Cited

U.S. PATENT DOCUMENTS

| | | | |
|---|---|---|---|
| 4,367,216 A | 1/1983 | Mutzel et al. | |
| 4,391,280 A | 7/1983 | Miller | |
| 4,630,203 A | 12/1986 | Szirtes | |
| 4,710,876 A | 12/1987 | Cline et al. | |
| 4,719,585 A | 1/1988 | Cline et al. | |
| 4,729,098 A | 3/1988 | Cline et al. | |
| 4,737,921 A | 4/1988 | Goldwasser et al. | |
| 4,751,643 A | 6/1988 | Lorensen et al. | |
| 4,791,567 A | 12/1988 | Cline et al. | |
| 4,823,129 A | 4/1989 | Nelson | |
| 4,831,528 A | 5/1989 | Crawford et al. | |
| 4,874,362 A | 10/1989 | Wiest et al. | |

(Continued)

FOREIGN PATENT DOCUMENTS

WO     9613207     5/1996

(Continued)

OTHER PUBLICATIONS

"CAESAR: A Smooth, Accurate and Robust Centerline Extraction Algorithm"; Proceedings of the conference on Visualization '00; Salt Lake City, Utah, United States; pp. 45-52; Year of Publication: 2000; ISBN:1-58113-309-X.*

(Continued)

*Primary Examiner*—Ulka Chauhan
*Assistant Examiner*—Eric Woods
(74) *Attorney, Agent, or Firm*—Dorsey & Whitney LLP

(57) ABSTRACT

Methods for generating a centerline or skeleton structure within a 3D virtual object are provided. A first method defines a centerline based on distance from boundary values along points of the defined centerline. A second method uses a distance from boundary field to assign costs to voxels in the virtual object and defines a minimum cost spanning tree based on assigned costs. The centerline is defined along the minimum cost spanning tree. Branches along the centerline are identified and added to the centerline to define a skeleton.

8 Claims, 4 Drawing Sheets

U.S. PATENT DOCUMENTS

| | | | |
|---|---|---|---|
| 4,879,668 | A | 11/1989 | Cline et al. |
| 4,984,157 | A | 1/1991 | Cline et al. |
| 4,985,834 | A | 1/1991 | Cline et al. |
| 4,985,856 | A | 1/1991 | Kaufman |
| 4,987,554 | A | 1/1991 | Kaufman |
| 4,993,415 | A | 2/1991 | Long |
| 5,006,109 | A | 4/1991 | Douglas et al. |
| 5,023,072 | A | 6/1991 | Cheng |
| 5,038,302 | A | 8/1991 | Kaufman |
| 5,047,772 | A | 9/1991 | Ribner |
| 5,056,020 | A | 10/1991 | Feldman et al. |
| 5,095,521 | A | 3/1992 | Trousset et al. |
| 5,101,475 | A | 3/1992 | Kaufman |
| 5,127,037 | A | 6/1992 | Bynum |
| 5,166,876 | A | 11/1992 | Cline et al. |
| 5,170,347 | A | 12/1992 | Tuy et al. |
| 5,187,658 | A | 2/1993 | Cline et al. |
| 5,204,625 | A | 4/1993 | Cline et al. |
| 5,229,935 | A | 7/1993 | Yamagishi et al. |
| 5,245,538 | A | 9/1993 | Lis |
| 5,261,404 | A | 11/1993 | Mick et al. |
| 5,265,012 | A | 11/1993 | Amans et al. |
| 5,270,926 | A | 12/1993 | Tam |
| 5,283,837 | A | 2/1994 | Wood |
| 5,295,488 | A | 3/1994 | Lloyd et al. |
| 5,299,288 | A | 3/1994 | Glassman et al. |
| 5,322,070 | A | 6/1994 | Goodman et al. |
| 5,345,490 | A | 9/1994 | Finnigan et al. |
| 5,361,763 | A | 11/1994 | Kao et al. |
| 5,365,927 | A | 11/1994 | Roemer et al. |
| 5,371,778 | A | 12/1994 | Yanof et al. |
| 5,442,733 | A | 8/1995 | Kaufman et al. |
| 5,458,111 | A | 10/1995 | Coin |
| 5,611,025 | A | 3/1997 | Lorensen et al. |
| 5,623,586 | A | 4/1997 | Höhne |
| 5,630,034 | A | 5/1997 | Oikawa et al. |
| 5,699,799 | A | 12/1997 | Xu et al. |
| 5,734,384 | A | 3/1998 | Yanof et al. |
| 5,782,762 | A | 7/1998 | Vining |
| 5,920,319 | A * | 7/1999 | Vining et al. ............... 345/420 |
| 5,971,767 | A * | 10/1999 | Kaufman et al. ........... 434/267 |
| 5,986,662 | A | 11/1999 | Argiro et al. |
| 6,130,671 | A | 10/2000 | Argiro |
| 6,219,059 | B1 | 4/2001 | Argiro |
| 6,272,366 | B1 | 8/2001 | Vining |
| 6,385,539 | B1* | 5/2002 | Wilson et al. ............... 701/213 |
| 2003/0099384 | A1* | 5/2003 | Zeng et al. ................. 382/128 |
| 2004/0091143 | A1* | 5/2004 | Hu .............................. 382/154 |
| 2004/0109603 | A1* | 6/2004 | Bitter et al. ................. 382/154 |

FOREIGN PATENT DOCUMENTS

| | | | |
|---|---|---|---|
| WO | 9811524 | | 3/1998 |
| WO | 9837517 | | 8/1998 |
| WO | WO 99/42977 | * | 8/1999 |
| WO | 0055812 | | 9/2000 |
| WO | 0055814 | | 9/2000 |

OTHER PUBLICATIONS

"Virtual Voyage: Interactive Navigation in the Human Colon"; Proceedings of the 24th annual conference on Computer graphics and interactive techniques; pp. 27-34; Year of Publication: 1997; ISBN:0-89791-896-7.*

"Dijkstra's Algorithm" http://en.wikipedia.org/wiki/Dijkstra's_algorithm and http://www.cs.sunysb.edu/~skiena/combinatorica/animations/dijkstra.html, 2004.*

"The Computer Science and Engineering Handbook", 1997, Editor-in-Chief: Alan B. Tucker, pp. 210-211, ISBN 0-8493-2909-4.*

Hong et al., "3D Virtual Colonoscopy," 1995 Biomedical Visualization Proceedings, pp. 26-32 and 83 (1995).

Hong et al., "3D Reconstruction and Visualization of the Inner Surface of the Colon from Spiral CT Data," IEEE, pp. 1506-1510 (1997).

William E. Lorensen, "The Exploration of Cross-Sectional Data with a Virtual Endoscope," Interactive Technology and the New Health Paradigm, IOS Press, pp. 221-230 (1995).

Adam L. Penenberg, "From Stony Brook, a New Way to Examine Colons, Externally," The New York Times, p. 6 (1996).

David J. Vining, "Virtual Colonoscopy," Advance for Administrators in Radiology, pp. 50-52 (1998).

Zhou et al., "Three-Dimensional Skeleton and Centerline Generation Based on an Approximate Minimum Distance Field," The Visual Computer, 14:303-314 (1998).

Liang Z et al., "Inclusion of a priori information in segmentation of colon lumen for 3D virtual colonscopy", 1997 IEEE Nuclear Science Symposium Conference Record, pp. 1423-1427, vol. 2.

Valev et al., "Techniques of CT colongraphy (virtual colonoscopy)", Critical Reviews in Biomedical Engineering, 1999, Begall House, vol. 27, No. 1-2, pp. 1-25.

Shibolet O et al., "Coloring voxel-based objects for virtual endoscopy", IEEE Symposium on Volume Visualization, Research Triangle, Oct. 1998.

Kaufman A., Wan M., "Disobstruction of Colon Wall Collapse", Project Description, online www.cs.sunysb.edu, Jan. 1999.

Holzapfel G A, et al., "Large strain analysis of soft biological membranes: formulation and finite element analysis", Computer Methods in Applied Mechanics and Engineering, vol. 132, No. 1-2, pp. 45-61, 1996.

Kaye J. et al., "A 3D virtual environment modeling mechanical cardiopulmonary interactings", CVRMED-MRCAS '97, pp. 389-398, 1997.

Burgard W. et al., "Active mobile robot localization by entrophy minimization", Proceedings second euromicro workshop on advanced mobile robots, pp. 155-162, 1997.

Suya You et al., "Interactive volume rendering for virtual colonoscopy", Proceedings Visualization '97, pp. 433-436, 571.

Pai D.K. et al., "Multiresolution Rough Terrain Motion Planning", IEEE Transactions on Robotics and Automatic, vol. 14, No. 1, 19-33, 1998.

Hagen H. et al., "Methods for Surface Interrogation", Proceedings of the Conference on Visualization, vol. CONF 1, pp. 187-193, 1990.

Chen et al., "A tree-branch searching, multiresolution approach to skeletonization for virtual endoscopy" Proc SPIE Medical Imaging, 2000.

Liang Z. et al., "Feasibility Studies on Extracting Bladder Wall from MR Images for Virtual Cystoscopy", 2000.

Chen et al., "Virtual Laryngoscopy: Feasibility Studies by CT and MRI", IEEE Medical Imaging Conference, Nov. 1999.

Chen et al., A multi-scan MRI-based virtual cystoscopy, SPIE 2000, Proc.

Chen et al., "MRI-Based Virtual Cystoscopy: The image segmentation and visualization", SPIE Conference, Feb. 12-18, 2000.

Chen et al., "A Fast Algorithm to Generate Centerline for Virtual Colonscopy", SPIE Conference, Feb. 12-18, 2000.

Richard Robb, "Virtual (Computed) Endoscopy: Development and Evaluation Using the Visible Human Datasets", Oct. 7-8, 1996. www.mayo.edu.

I. Bitter et al., "Penallized-Distance Volumetric Skeleton Algorithm", IEEE Transactions on Visualization and Computer Graphics, vol. 7, No. 3, Jul.-Sep. 2001, pp. 195-206.

M. Wan et al., "Distance-Field Based Skeletons for Virtual Navigation", *Visualization 2001*, San Diego, CA, Oct. 2001.

M. Sato et al., "An automatic colon segmentation for 3D virtual colonoscopy", IEICE Trans. Information and Systems, vol. E84-D, No. 1, Jan. 2001, pp. 201-208.

D. Chen et al., "A Novel Approach to Extract Colon Lumen from CT Images for Virtual Colonoscopy" IEEE Transactions on Medical Imaging, vol. 19, No. 12, Dec. 2000, pp. 1220-1226.

M. Wax et al., "Virtual Colonoscopy—CT Contrast Agent", Second International Symposium on Virtual Colonoscopy, Boston, MA, Oct. 2000.

K. Kreeger, et al., "Volume Rendering for Virtual Colonoscopy on an Affordable PC", Second International Symposium on Virtual Colonoscopy, Boston, MA, Oct. 2000.

S. Lakare et al., "3D Digital Cleansing Using Segmentation Rays", IEEE Visualization 2000 Conference Proceedings, ACM/SIGGRAPH Press, pp. 37-44, Oct. 2000.

S. Lakare et al., "Automated Pre-navigation processing for Virtual Colonoscopy", Second International Symposium on Virtual Colonoscopy, pp., Oct. 2000.

K. Kreeger et al., "Perspective Virtual Endoscopy with VolumePro Parallel Rendering", Center for Visual Computing and Department of Computer Science, pp. 1-8, 2000.

D. Chen et al. "A tree-branch searching, multi-resolution approach to skeletonization for virtual endoscopy", SPIE Medical Imaging 2000, Feb. 2000.

M. Wan et al., "3D Virtual Colonoscopy with Real-time Volume Rendering", SPIE Medical Imaging 2000, Feb. 2000.

M. Wax et al., "Advancing Virtural Colonoscopy to Practice", International Workshop on 3D Imaging and Virtual Endoscopy, Feb. 2000.

W. Li et al., "Virtual Colonoscopy Powered by VolumePro", pp. 1-13, month unavailable 1999.

M. Wan et al., "Volume Rendering Based Interactive Navigation within the Human Colon", IEEE Visualization '99 conference, San Francisco, CA, Oct. 1999, pp. 397-400.

R. Chiou et al., "Interactive Fly-Path Planning Using Potential Fields and Cell Decomposition for Virtual Endoscopy", IEEE Trans. Nuclear Sciences, vol. 46, No. 4, Aug. 1999, pp. 1045-1049.

D. Chen et al., "MR Imaging and Segmentation of the Colon Wall for Virtual Colonscopy", Soc. Magn. Reson. Medicine, vol. 3, pp. 2203, 1999.

R. Chiou et al., "Volume Segmentation and Rendering of Mixtures of Materials for Virtual Colonoscopy", SPIE Medical Imaging '99, Feb. 1999, pp. 133-138.

Z. Liang et al., "On Segmentation of Colon Lumen for Virtual Colonoscopy", SPIE Medical Imaging, Feb. 1999, pp. 270-278.

Z. Liang et al., "Virtual Endoscopy in Early Detection of Cancers", Biomedical Imaging Symposium: Visualizing the Future of Biology and Medicine, Washington, D.C., Feb. 1999.

R. Chiou et al., "Unified Analysis, Modeling, Matching and Synthesis for CT Color Texture Mapping from the Visible Human Dataset", The Second Visible Human Project Conf., Bethesda, MD, Oct. 1998.

M. Wan et al., "Boundary Cell-Based Acceleration for Volume Ray Casting", Computer & Graphices, vol. 22, No. 6, 1998, pp. 715-721.

R. Chiou et al., "Interactive Path Planning for Virtual Endoscopy", Conf. Record IEEE NSS-MIC, Nov. 1998.

M. Wax et al., "Electronic Colon Cleansing for Virtual Colonoscopy", Presentation at the first Int'l . Conf. on Virtual Colonoscopy, Boston, MA, Oct. 1998.

L. Hong et al., "Virtual Voyage: Interactive Navigation in the Human Colon", Proc. ACM SIGGRAPH '97, Aug. 1997, pp. 27-34.

A. Viswambharan et al., "Virtual Colonoscpy: Three-dimensional Reconstruction of the Mucosal Surface of the Colon", Conf. of Radiological Society of North America (RSNA), Dec. 1996, pp. 565 (Scientific Merit Award).

L. Hong et al., "Physcially-Based Interactive Navigation", Technical Report TR.96.01.09, Computer Science Department, SUNY at Stony Brook, Jan. 1996.

L. Hong et al., "Visible Human Virtual Colonoscopy", Conference of National Library of Medicine Visible Human Project, Oct. 1996, pp. 29-30.

80th Scientific Assembly and Annual Meeting Nov. 27-Dec. 2, 1994, Radiology Society of North America Founded in, InfoRAD Exhibits.

* cited by examiner

US 7,324,104 B1

METHOD OF CENTERLINE GENERATION IN VIRTUAL OBJECTS

RELATED APPLICATIONS

This application claims the benefit of U.S. Provisional Application Ser. No. 60/322,046, entitled "Advanced Navigation and Detection for Virtual Examination," which was filed on Sep. 14, 2001, the disclosure of which is hereby incorporated by reference in its entirety. This application may also be considered related to application Ser. No. 10/246,016, filed on Sep. 16, 2002 and entitled "System and Method for Navigating in Virtual Environments Using a Fluid Model" and to application Ser. No. 10/246,070 filed on Sep. 16, 2002, entitled "Computer Assisted Detection of Lesions Volumetric Medical Images."

Other co-pending applications which may be considered "related" to the present application include: Ser. No. 10/182,217, with a filing date of Feb. 19, 2003 and entitled "Computer Aided Treatment Planning;" Ser. No. 10/380,211, with a filing date of Feb. 2, 2004 and entitled "Centerline and Tree Branch Skeleton Determinator for Virtual Objects;" Ser. No. 10/297,349 with a filing date of Dec. 5, 2002 entitled "System and Method for Computer Aided Treatment Planning and Visualization With Image Registration and Fusion;" Ser. No. 10/380,210 with a filing date of Mar. 12, 2003 and entitled "Enhanced Virtual Navigation and Examination;" Ser. No. 09/974,548 filed on Oct. 10, 2001 and entitled "System and Method for Performing a Three Dimensional Virtual Segmentation and Examination with Optical Texture Mapping;" Ser. No. 09/777,120 filed on Feb. 5, 2001 and entitled "System and Method for Performing a Three Dimensional Virtual Examination of Objects, Such as Internal Organs."

FIELD OF THE INVENTION

The present invention relates generally to 3D virtual environments and more particularly relates to methods for generating centerlines and skeletons in virtual objects presented in 3D virtual environments.

BACKGROUND OF THE INVENTION

With the rapid increases in both scale and complexity of virtual environments, an efficient navigation capability becomes critical in virtual reality systems. This is particularly true in medical applications, which require navigation through complex structures such as the colon, aorta, lungs and the like. This implies the presence of efficient flight-path planning. Many known navigation techniques focus primarily on a planned navigation mode, where a movie is computed by automatically moving a virtual camera along a precomputed flight path from a start point of a virtual object to an end point of the object and generating a sequence of navigation frames. Centerline algorithms are often used as the flight path to give wide views at the object center. Such algorithms are useful when the virtual environment depicts a luminar structure, such as a colon or artery.

The following properties are considered desirable for a flight-path planning:

(1) To obtain a wide view of the virtual environment, the path should stay away from the surface.
(2) The path should be a one-voxel-wide simple path without any 2D manifolds or self-intersection.
(3) Any two adjacent voxels on the path should be directly connected, i.e., at most one, two, or three of their 3D coordinates differ by one, forming a 6-, 18-, or 26-connected path.
(4) The path planning procedure should be fast and automatic, which frees the user from having to engage in the data processing.

There has been a great deal of research on flight-path planning techniques based on an object centerline or a set of connected centerlines, generally referred to as a skeleton. Most of the centerline extraction algorithms can be divided into three categories: manual extraction, distance mapping, and topological thinning.

Manual extraction, which requires the user to manually mark the center of each object region slice by slice, neither satisfies property 4 nor guarantees property 3. It may violate property 1, because a center point in a 2D slice may not lie along the medial axis in the 3D space.

Distance mapping often employed Dijkstra's shortest path algorithm to extract the centerline or flight path rapidly with full automation. This technique generally satisfies properties 2 through 4. Unfortunately, it does not satisfy property 1, because the shortest path tends to hug corners at high-curvature regions. Efforts have been made to push the shortest path towards the object center by post-remedy. However, such efforts have not completely solved the problem, or involve distance function adjustment based on other measurements, and are computationally complex and expensive.

Topological thinning generates center paths by peeling off a volumetric object layer by layer until there is only one central layer left. This technique satisfies properties 1 through 3 very well, but it does not satisfy property 4, due to the expensive processing iteration. Paik et al. have accelerated this technique by incorporating the above shortest path method in parallel with a thinning procedure. However, the manual detection of the tip for each branches in this technique needs to be improved. This is described Automatic Flight Planning for Virtual Endoscopy", Medical Phys., 1998, 25(5), 629-637.

SUMMARY OF THE INVENTION

In accordance with the present invention methods to compute centerlines and skeletons of virtual objects are provided. A first method is based on a distance from boundary field in which each voxel has as its value the distance of its position from the object boundary. Starting from the largest DFB value voxel or from an extreme point of the object (i.e. lowest point) points along the centerline are found in jumps that can be as large as the DFB value of the previously found point. All points considered as jump targets are examined to find the one among them that is a local DFB field maximum and is furthest from the start location. Connecting the jump points results in the centerline and also considering secondary jump targets (not only the furthest one) results in computation of the complete skeleton.

A second method is also based on a distance from boundary field. It converts the DFB values into costs that are highest for low DFB values and lowest for high DFB values. Then a minimum cost spanning tree (MCST) rooted at a seed point is computed for all cost voxels in the object. The point of the MCST furthest from the seed point is the other end of the centerline and the connection path along tree edges is the centerline. Finding points that are furthest from any skeleton voxel and connecting them along the edges of then MCST add branches of the skeleton.

A third method is a general method to improve the speed of the second method or any other method for centerline or skeleton computation that is based on having to examine all voxels in the object. The increased processing speed comes from obviating the need to evaluate all voxels in the object. Starting with an initial approximate centerline or skeleton, the centerline or skeleton computation method can be applied to a fake object that consists of just the centerline voxels and those very close to it, but still use the DFB values computed ones beforehand for the complete object. The resulting centerline/skeleton is an improvement over the initial one. The process can be iterated by using the result of the previous iteration as input to the next. Eventually this results in a centerline/skeleton that does not change any more which can then be used as final higher quality centerline/skeleton.

DETAILED DESCRIPTION OF THE PREFERRED EMBODIMENTS

The present invention will be described in the context of systems and methods for performing examination and navigation of virtual objects, such as in virtual colonoscopy procedures, but is not limited to such procedures. A system and method for performing such virtual examination and visualization of 3D virtual objects is described in U.S. Pat. No. 6,343,936, entitled "System and Method for Performing a Three-Dimensional Virtual Examination, Navigation and Visualization," the disclosure of which is hereby incorporated by reference in its entirety. The present invention assumes that such systems and methods are used to acquire image data, create a three dimensional model of a virtual object and display the virtual object using a graphical user interface or other suitable user interface.

Figure 1:
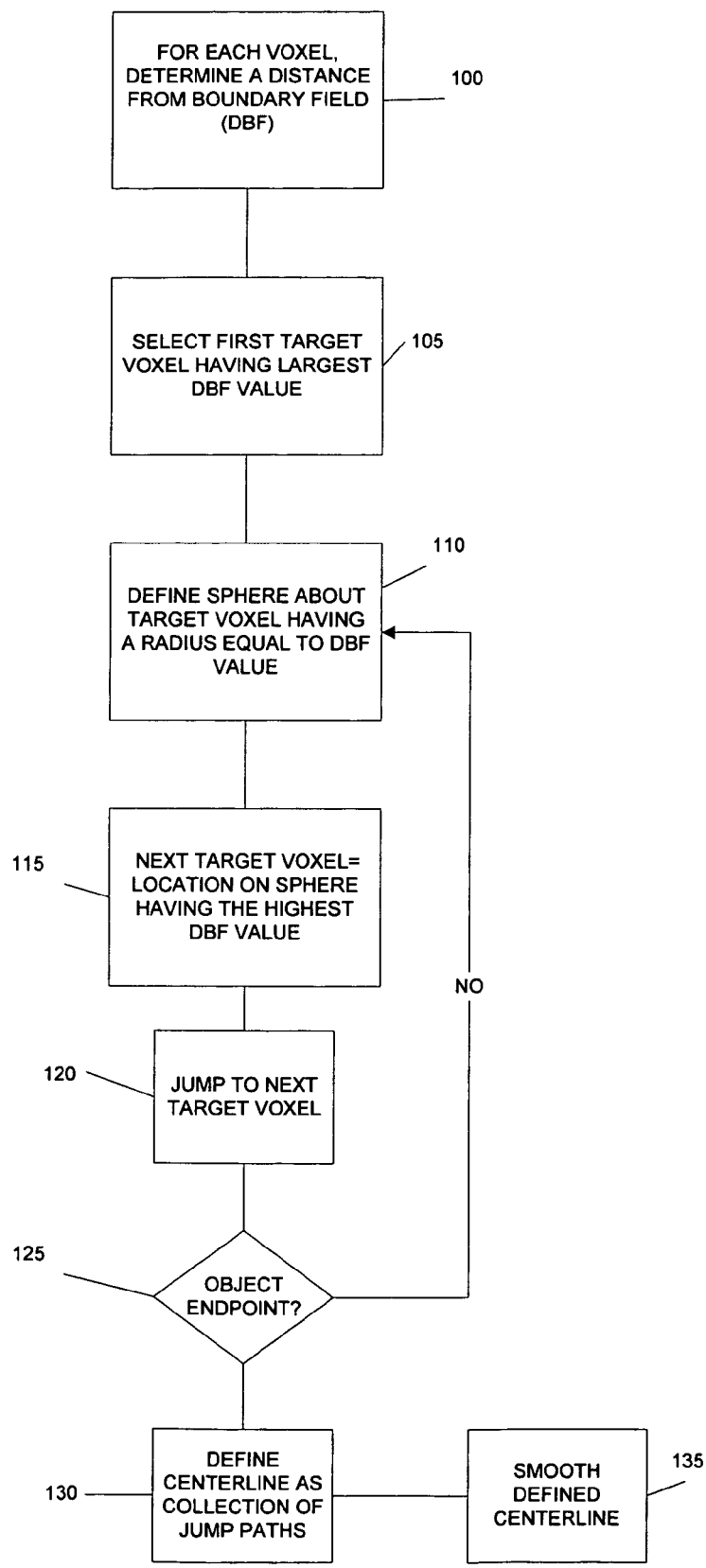
FIG. 1 is a flow chart illustrating a first method of centerline generation in accordance with the present invention.

Referring to FIG. 1, a first method in accordance with the present invention determines the centerline through a virtual object based on a distance from boundary (DFB) field in which each voxel has as its value the distance of its position from the object boundary. In step 100, each voxel of the virtual object is assigned a value based on its distance from the boundary of the virtual object.

Figure 2:
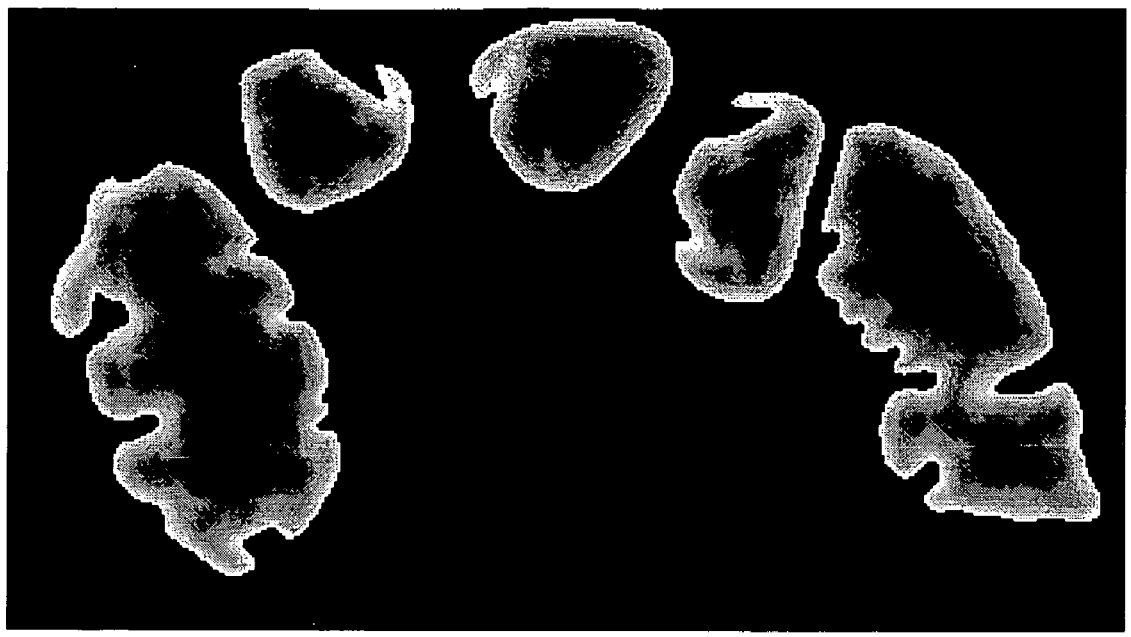
FIG. 2 is a pictorial representation of the distance from boundary (DFB) force gradient in a cross section of a colon mapped to gray scale colors: black outside the region, white on the boundary, white to dark gray gradient for increasing distance from boundary.

FIG. 2 is a pictorial representation of the DFB field within a portion of the cross section of a colon lumen. In FIG. 2, the magnitude of the DFB field for each voxel is represented by gray scale values ranging from white at the object boundary to black at the maximum distance from the boundary.

A first voxel in the virtual object is selected, such as the voxel having the largest DFB value voxel or from an extreme point of the object (i.e. the lowest point) selected by the user (step 105). Points along the centerline are found in jumps that can be as large as the DFB value of the previously found point. In one embodiment of the invention, a sphere is defined around the selected voxel which has a radius equal to the DFB value of the selected value (step 110). The jump target is a voxel on the surface of the sphere centered at the current point having a radius equal to the DFB value (step 115). In another embodiment the jump target can be the surface of a box which is inscribed in the aforementioned sphere.

Points considered as jump targets are examined to find the one among them that is a local DFB field maximum and is furthest from the start location. The algorithm jumps from the current voxel to the appropriate target voxel (step 120). This process is continued until the object endpoint is reached (step 125). Connecting the jump points results in the centerline (step 130). In one embodiment of the invention the connection is achieved through a straight line. In another embodiment, ridge tracking in the DFB field can be used to connect the jump points. Alternatively, a smooth curve can be used to connect the jump points (step 135).

The centerline can be considered complete when the region boundary is reached or when the current point has a DFB value below a given threshold. If the computation was started from a seed point in the center of the object (i.e. a maximum DFB location), then a second path of the same procedure has to be applied to find the other half of the centerline. Also, by considering secondary jump targets (not only the furthest one) a complete skeleton (as opposed to a single centerline) can be defined.

Referring to FIG. 2, a second method in accordance with the present invention is also based on a distance from boundary field. In step 300 a distance from boundary (DFB) field is determined for each voxel of the virtual object. This embodiment converts the DFB values into costs that are highest for low DFB values and lowest for high DFB values (step 305). A seed voxel is selected as a starting point (step 305) and a minimum cost spanning tree (MCST) rooted at a seed point is then computed for all cost voxels in the object (step 315). The point of the MCST furthest from the seed point is the endpoint of the centerline (step 320) and the connection path along tree edges is the centerline (step 325). Finding points that are furthest from any skeleton voxel and connecting them along the edges of the MCST adds branches of the skeleton (step 330).

Figure 4:
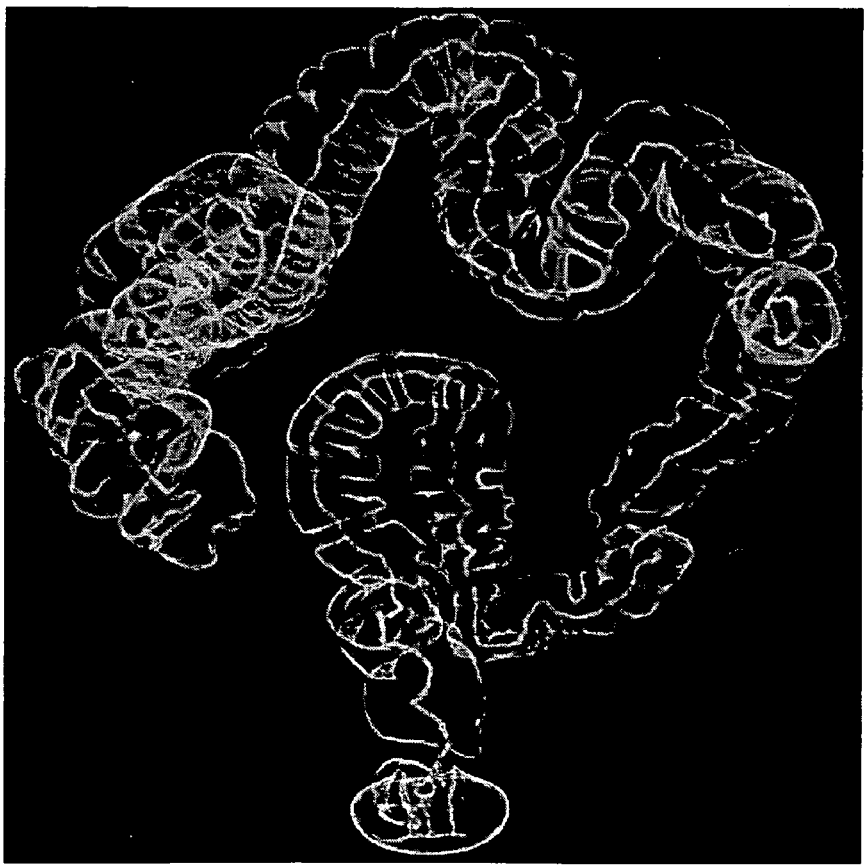
FIG. 4 is a pictorial representation of a Colon as an example of a segmented region with the centerline shown inside.

The algorithm of FIG. 2 consists of building a minimum-cost spanning tree in the DFB field and extracting the colon centerline and its branches from the tree. Preferably, the DFB values used in the present algorithms are the exact real Euclidian distances, computed by a fast four-path algorithm, such as proposed by Saito et al. "New Algorithm for Euclidean Distance Transformation of an N-Dimensional Digitized Picture with Applications," *Pattern Recognition*, 1994, 27(11): 1551-1565, which is hereby incorporated by reference in its entirety. Employing this algorithm, a complete connected colon region in a 512×512×361 CT volume, which is depicted in FIG. 4, was calculated in about 20 seconds.

Returning to FIG. 3, step 305 can be separated into two stages. In the first stage the volumetric DFB field is converted into a 3D directed weighted graph. Second, a minimum-cost spanning (MCS) tree is built from the weighted graph.

During the mapping from a volumetric data set to a 3D directed weighted graph, each voxel forms a node in the graph, while edges represent the 26-neighbor relations between voxels. Each edge has two directions pointing towards its two end nodes, respectively. Each direction has its own weight the inverse of the DFB value of the end node it points to, in order to build a minimum-cost spanning tree. To distinguish the regular DFB value from its inverse, we call the latter value DFB cost. The present mapping is different from those in the traditional distance mapping algorithms, where the length of each edge is used as its weight to form an undirected graph.

A minimum-cost spanning tree for the present directed graph is defined as a tree that connects all the voxels in the navigable region at the minimum DFB cost. In order to build such a MCS tree one can use the standard Dijkstra algorithm for computing the minimum cost of each node to reach a chosen source node S, where the source S is predefined by the user. Specifically, the present algorithm computes the cost of a node at a voxel to be entered into a heap of discovered nodes as the inverse of the distance from boundary at that voxel. The distance from source (DFS) is also accumulated as part of the Dijkstra algorithm progression according to: dfs(B)=dfs(C)+distance(B,C).

Figure 3:
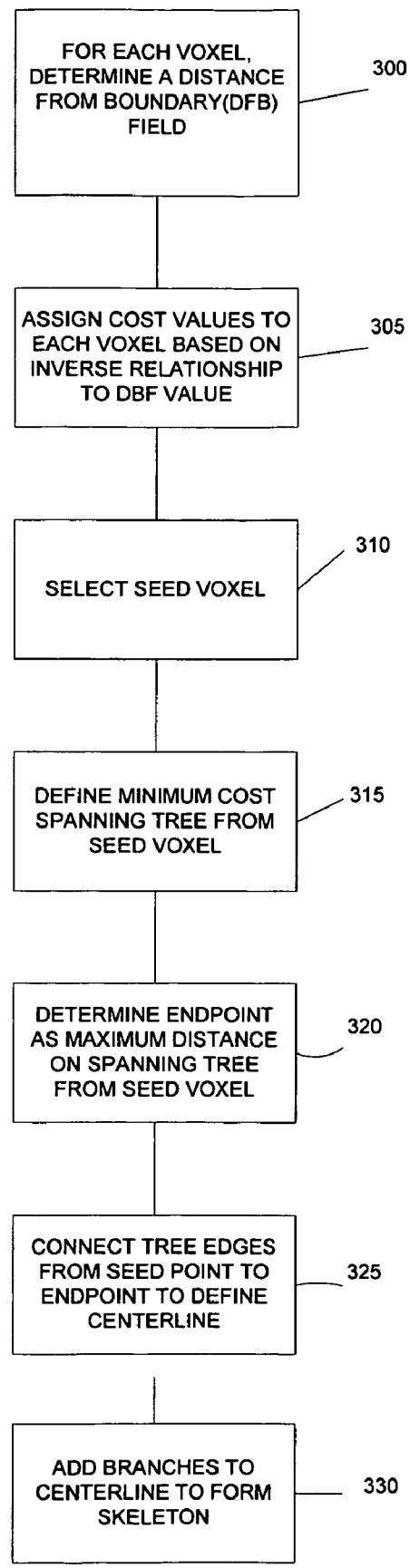
FIG. 3 is a flow chart illustrating a first method of centerline generation in accordance with the present invention.

Referring to FIG. 3, step 315 can be implemented using a fast heap-sorting technique to detect the node with the minimum DFB cost in the current heap in O(log N) time. Thereby, the algorithm processing is completed in O(N log N) time. The heap data structure tends to be simpler and faster than other sorting data structures that have the same computational complexity, such as the balanced binary tree.

As a result, the ordering of the voxels leaving the heap represents the connectivity of the MCS. Further, each inside voxel of the object contains a DFS value recording the length of this minimum DFB cost path. The DFS values are used to find the centerline and its branches in the subsequent step, and can also contribute to interactive measurements during navigation when desired.

The centerlines extracted from the MCS tree provide a concise global picture of the topological features of the object, and serve as a guide during navigation.

Figure 5:
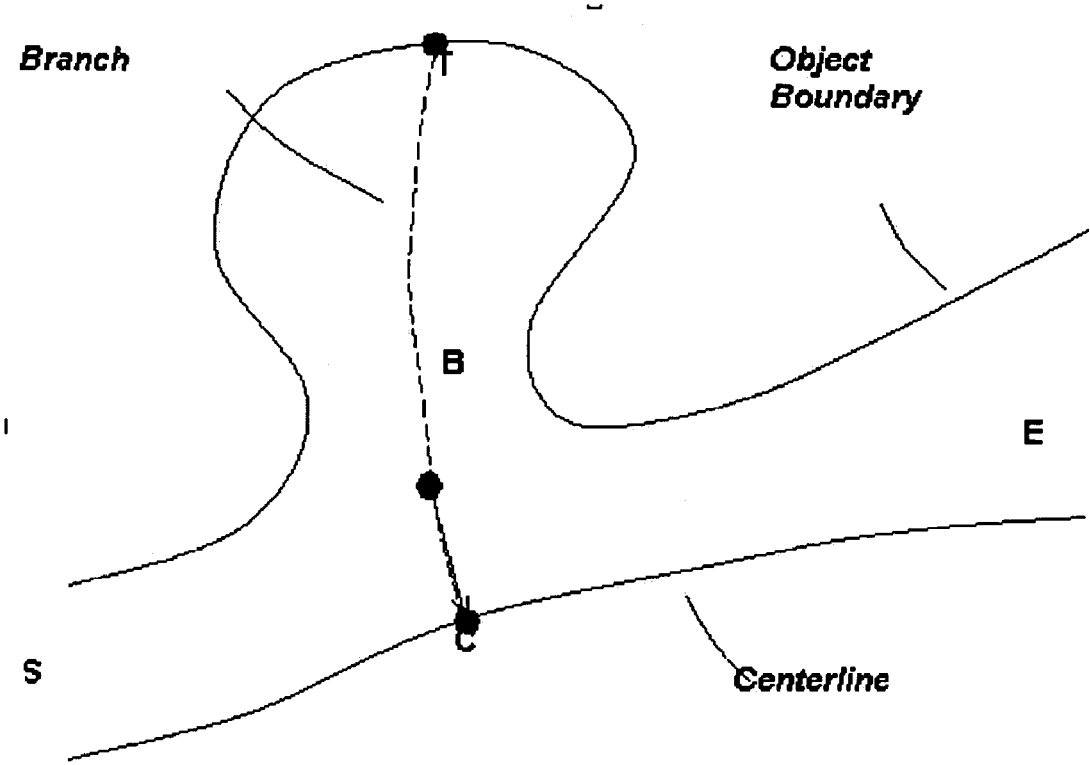
FIG. 5 is a schematic representation of the cross section of a colon lumen illustrating a branch being connected to the centerline.

Referring to FIG. 5, the method of FIG. 3 can be viewed as containing two stages: first, to extract a main centerline of the object ending at the source point S; second, to detect all the branches B attached to the main centerline. If the other end, E, of the main centerline is given, then the sequence of voxels, on the centerline can be determined by tracing back from E to S according to the MCS connectivity. Alternatively, the algorithm can automatically select the voxel with the maximum DFS value as the other end E of the centerline so that the centerline spans the entire object. From the perspective of the MCS tree, the centerline is the longest branch in the tree that starts from root S.

An efficient branch extraction algorithm for use in connection with step 330 (FIG. 3) can be implemented as follows to automatically detect all the branches attached to the main centerline in O(N) time.

Step 1. Scan centerline voxels by tracing back from the end E to the source S according to MCS connectivity (see FIG. 2).

Step 2. For each centerline voxel C, check its 24 neighbors (excluding the two neighbors on the centerline) and find out each neighbor B that is MCS connected to C.

Step 3. For each B, find the MCS sub-tree rooted at B and identify voxel T with the largest DFS value among them. Then compute the length len(B) between B and T as dfs(T)−dfs(B). If len(B) is larger than a user-specified threshold of the branch length, we store T as the tip of a branch growing from centerline voxel C through its neighbor B.

The above branch detection procedure is capable of detecting all branches directly connected to the centerline, including those associated with the same centerline voxel. To further detect higher-level branches when desired, the above algorithm can be extended by recursively scanning each branch to find all the higher-level branches, but it will be appreciated that the computational expenses increases in this case.

From current experience, the main centerline gives the most compact shape description of the object, while the first-level skeleton consisting of the centerline and its directly attached branches provides sufficient shape information for navigation needs. A centerline with multiple level branches is generally only needed for complex objects where a detailed navigation map is required. By adjusting the threshold of branch length in our last recursive solution, the level of detail during the branch extraction can be controlled.

A third method in accordance with the invention is a general method to improve the speed of the second method or any other method for centerline or skeleton computation that is based on having to examine all voxels in the object. The improvement in speed comes from avoiding looking at all voxels in the object. Starting with an initial approximate centerline or skeleton, the centerline or skeleton computation method is applied to a fake object that consists of just the centerline voxels and those voxels close to it. The resulting centerline/skeleton is an improvement over the initial one. The process can be iterated using the result of the previous iteration as input to the next. Eventually this results in a centerline/skeleton that doe not change any more which can then be used as final higher quality centerline/skeleton. To further improve speed, the method can be extended to include neighboring voxels only where the centerline/skeleton voxels did change in the previous iteration.

The present centerline extraction algorithms based on such an accurate DFB value is more accurate than the accurate thinning algorithms that used the approximation conformation metrics for boundary distance measurements. Meanwhile, it also achieves a much higher speed than the fastest distance mapping algorithms because of its low computational complexity and high optimization.

The present invention provides simple solutions for centerline and flight path generation, which satisfies all four desired flight path properties. The centerline algorithms are derived from a concise but precise centerline definition based on the DFB field. The centerlines are defined based on DFB fields, such as the minimum-cost paths spanning the DFB field inside a volume data set. This definition has the following advantages. It precisely defines the centerline for distance mapping techniques by focusing on a centered path rather than a shortest path. In addition, it suggests a provably fast and accurate solution.

What is claimed is:

1. A computer-readable medium which includes thereon a set of instructions for generating a centerline in a virtual object represented as a plurality of voxels, wherein the set of instructions are configured to program a processing arrangement to perform the steps of:

computing the distance from boundary (DFB) for each voxel in the virtual object;

selecting a seed point in the virtual object as the current voxel;

selecting a next point from a set of points having a distance from the current voxel determined by the distance from boundary value of the current voxel;

connecting the current voxel to the next point and assigning the next point as the new current voxel; and repeating the steps of selecting a next point and connecting until the centerline for the object is complete, thereby generating a centerline for at least one of display and navigation within the virtual object;

wherein the set of points is the set of voxels on the surface of at least a portion of a sphere centered at the current voxel and having a radius equal to the DFB value of the current voxel, and wherein the next point has a DFB value that is higher than the DFB value of its neighbors.

2. The computer readable medium containing instructions for generating a centerline as set forth in claim 1, wherein the next point is the voxel on the surface of the sphere having the maximum DFB value.

3. A computer-readable medium which includes thereon a set of instructions for generating a centerline in a virtual object represented as a plurality of voxels, wherein the set of instructions are configured to program a processing arrangement to perform the steps of:

computing the distance from boundary (DFB) for each voxel in the virtual object;

selecting a seed point in the virtual object as the current voxel;

selecting a next point from a set of points having a distance from the current voxel determined by the distance from boundary value of the current voxel;

connecting the current voxel to the next point and assigning the next point as the new current voxel; and repeating the steps of selecting a next point and connecting until the centerline for the object is complete, thereby generating a centerline for at least one of display and navigation within the virtual object, wherein the set of points is defined by the surface of a cube inscribed within the sphere.

4. The computer readable medium containing instructions for generating a centerline as set forth in claim 1, wherein the connection of current voxels and next points is defined by straight line segments.

5. The computer readable medium containing instructions for generating a centerline as set forth in claim 1, wherein the connection of current voxels and next points is defined by a ridge in the DFB field between each two connected voxels.

6. The computer readable medium containing instructions for generating a centerline as set forth in claim 1, wherein the connection of current voxels and next points is defined by a smooth curve.

7. A system for generating a centerline of a virtual object represented as a plurality of voxels, comprising:

a computer-readable medium which includes thereon a set of instructions, wherein the set of instructions are configured to program a processing arrangement to:

compute the distance from boundary (DFB) for each voxel in the region;

select a seed point in the region;

compute a minimum cost spanning tree (MCST) rooted at the seed point for all voxels in the region;

determine the furthest voxel with the longest piecewise accumulated distance along the edges of the MCST; and define the centerline as the path within the MCST between the seed voxel and the furthest voxel, thereby generating a centerline for at least one of display and navigation within the virtual object;

wherein computing a minimum cost spanning tree includes assigning a cost value to voxels which is inversely proportional to the voxel's DFB value; and wherein the centerline is determined from back-trace in an accumulated cost field using the local gradient descent.

8. Computer readable media programmed with instructions to direct a computer to generate a centerline of a virtual object comprising the steps:

computing the distance from boundary (DFB) for each voxel in the region;

selecting a seed point in the region;

computing a minimum cost spanning tree (MCST) rooted at the seed point for all voxels in the region;

determining the furthest voxel with the longest piecewise accumulated distance along the edges of the MCST; and defining the centerline as the path within the MCST between the seed voxel and the furthest voxel, thereby generating a centerline for at least one of display and navigation within the virtual object;

wherein the step of computing a minimum cost spanning tree includes assigning a cost value to voxels which is inversely proportional to the voxel's DFB value; and wherein the centerline path is determined from back-trace in an accumulated cost field using the local gradient descent.

* * * * *